2,723,199

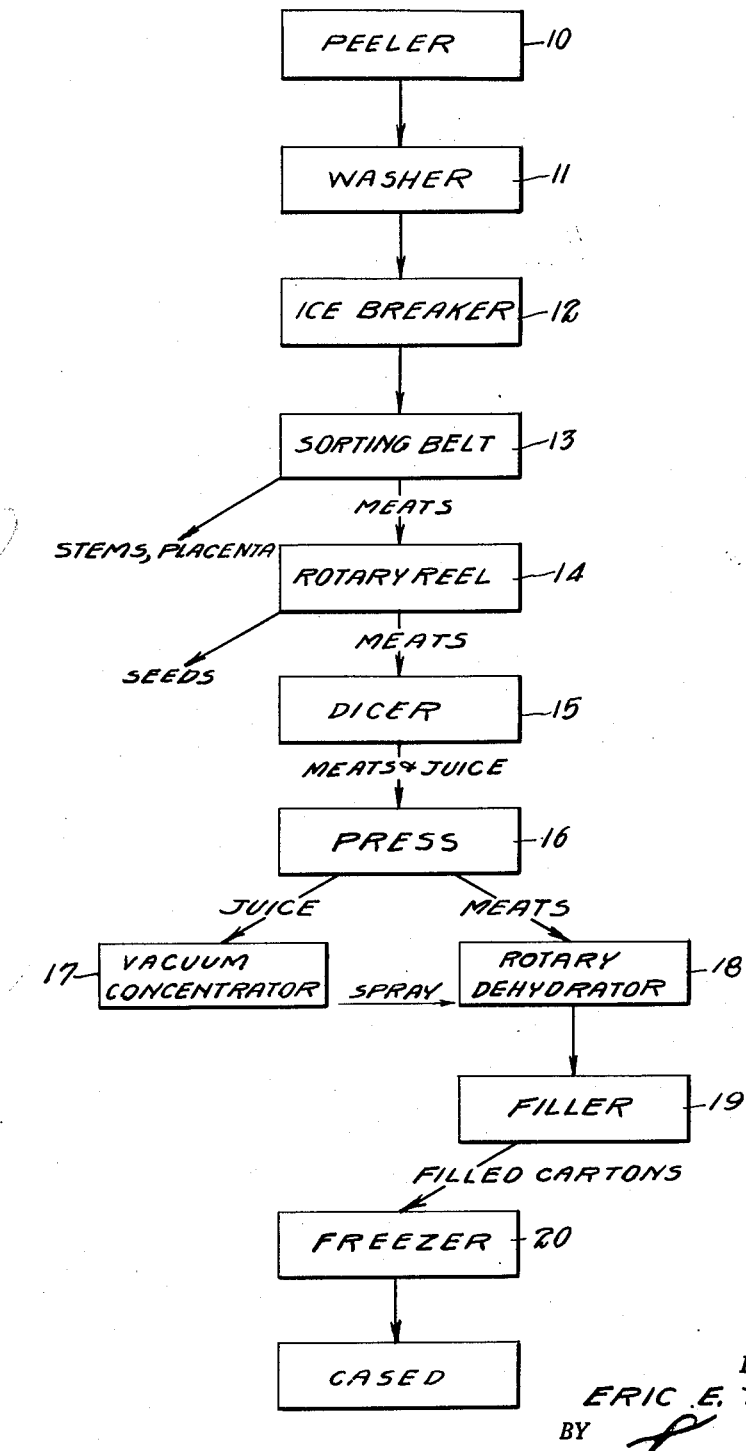

PROCESS FOR DEHYDRATING AND FREEZING PIMIENTOS AND PEPPERS

Eric E. Todd, Malibu, Calif., assignor to Ventura Farms Frozen Foods, Incorporated, Oxnard, Calif., a corporation of California Application February 8, 1954, Serial No. 408,855

4 Claims. (Cl. 99—104)

This invention relates to a process for dehydrating and freezing pimientos and peppers and more particularly to a mechanized process covering the complete handling of pimientos from the condition in which they are received at the packing plant until they are boxed and frozen.

In the dehydrating and freezing of such pimientos and peppers, problems are met in coring for the proper removal of the stems and placenta, in the deseeding, particularly to prevent loss of soluble solids which occurs if water is used in the deseeding, in dicing to give a uniform product. Furthermore, in the concentrating of the meats, it has been common to exaggerate the concentration requiring excess drying time and impairing the color of the meats. Furthermore, problems are encountered in the concentration step resulting in sticking of the meats.

It is accordingly one object of this invention to provide a mechanized process for the dehydrating and freezing of pimientos and peppers which avoids the above-mentioned problems and difficulties.

It is a further object of this invention to provide such a process in which soluble solids present in the juices are retained in the final product and the loss of such soluble solids is eliminated.

These and other objects, features and advantages will be apparent from the annexed specification in which the figure illustrates diagrammatically the various steps of the process.

In carrying out the process of this invention, the pimientos or peppers as received by the packing house are first peeled in a peeling stage indicated by the box 10. Steam or flame peeling is preferred in which case after peeling the meats are thoroughly washed in a washer 11. The washed meats are then broken up, preferably in a conventional ice breaker indicated by the box 12. The broken meats are then passed to a sorting belt 13 from which the stems and placenta are removed. From the sorting belt, the broken meats are passed to a screen, preferably in the form of a rotary reel 14 provided with conventional lifter rolls and either peforated sides or spaced rods to allow passage of the seeds. In the rotary reel 14, the lifters roll the meats resulting in a thorough separation of the seeds. From the rotary reel, the meats pass to a dicing stage indicated by the box 15 wherein the meats are diced, and the meats and juice are then passed to a rotary centrifuge or press 16. From the press 16, the juice passes to a vacuum concentrator 17 wherein the juice is concentrated and evaporated to approximately 50 Brix, while the juice depleted meats are passed to a rotary dehydrator 18 in which preferably the meats are concentrated approximately twofold; i. e. to one-half their original volume. At the end of the dehydration stage, there normally arises a problem of adhesion or sticking of the meats. At this point, the concentrated juice from the vacuum concentrator is passed in the form of a spray to the dehydrated meats in the dehydrator, which spray acts as a lubricant, prevents adhesion or sticking and as the concentrated juice is rapidly soaked up by the dehydrated meats, the meats emerge from the dehydrator with the juice incorporated therein and with a dry surface. From the dehydrator, the meats are then passed to a filler 19 in which they are packed in cartons, which cartons are then placed in a freezer 20 for freezing. From the freezer 20, the filled and frozen cartons are then cased and stored.

While there has been described what is at present considered the preferred form of the present process, it will be appreciated that certain changes and modifications could be made therein without departing from the essence of the invention, the most important element of which is the separation of the juices from the meats prior to dehydrating the meats and the subsequent reincorporation of the concentrated juices in the meats, and while the term "pimientos" is used in the appended claims, it will be appreciated that the process also contemplates the dehydration and freezing of peppers, and therefore the word "pimientos" is to be understood to include as a full equivalent the word "peppers."

I claim:

1. The process of dehydrating and freezing of pimientos comprising the steps of: peeling, washing and breaking said pimientos, sorting out stems and placentas; screening out seeds; dicing the pimiento meats; pressing out the juices; separately concentrating said juices; separately concentrating said juices; separately dehydrating the juice depleted meats; mixing the dehydarted meats and the concentrated juice to form a dry product with said juices adsorbed in said dehydrated meats, and packing and freezing said product.

2. The process set forth in claim 1 in which said juices are concentrated in said concentrating step to approximately 50 Brix.

3. The process set forth in claim 1 in which said meats are dehydrated and concentrated in said dehydrating step to approximately one-half original volume.

4. The process set forth in claim 2 in which said meats are dehydrated and concentrated in said dehydrating step to approximately one-half original volume.

References Cited in the file of this patent

UNITED STATES PATENTS 2,444,579    Newsom _____ July 6, 1948